United States Patent
Sakata

(10) Patent No.: US 9,760,999 B2
(45) Date of Patent: *Sep. 12, 2017

(54) IMAGE PROCESSING APPARATUS, IMAGING APPARATUS, AND IMAGE PROCESSING METHOD

(71) Applicant: OLYMPUS CORPORATION, Tokyo (JP)

(72) Inventor: Seiichiro Sakata, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 235 days.

This patent is subject to a terminal disclaimer.

(21) Appl. No.: 14/573,040

(22) Filed: Dec. 17, 2014

(65) Prior Publication Data

US 2015/0103145 A1    Apr. 16, 2015

Related U.S. Application Data

(63) Continuation of application No. PCT/JP2013/053883, filed on Feb. 18, 2013.

(30) Foreign Application Priority Data

Jun. 20, 2012   (JP) ................................ 2012-138569

(51) Int. Cl.
  *G06T 7/60*   (2017.01)
  *G06T 7/00*   (2017.01)
  (Continued)

(52) U.S. Cl.
  CPC ............ *G06T 7/0044* (2013.01); *G06T 7/246* (2017.01); *G06T 7/579* (2017.01); *G06T 7/73* (2017.01);
  (Continued)

(58) Field of Classification Search
  CPC ........... G06T 2207/10012; G06T 2207/10028; G06T 2207/30244; G06T 7/0042;
  (Continued)

(56) References Cited

U.S. PATENT DOCUMENTS 5,856,829 A * 1/1999 Gray, III ................. G06T 15/10
                                                   345/419
6,388,672 B1 * 5/2002 Ide ....................... G06F 9/30014
                                                   345/538

(Continued)

FOREIGN PATENT DOCUMENTS

CN       102208116 A    10/2011
JP       H11-194027 A    7/1999
            (Continued)

OTHER PUBLICATIONS

Liu et al, A Hybrid Stero Matching Algorithm Using Wavelet Modulus Maxima Based on Feature and Area Process, Aug. 22-26, 2004.*

(Continued)

*Primary Examiner* — Shan Elahi

(74) *Attorney, Agent, or Firm* — Scully, Scott, Murphy & Presser, P.C.

(57) ABSTRACT

An image processing apparatus includes an image acquisition unit that acquires a plurality of images, a corresponding point acquisition unit, a first fundamental matrix calculation unit, a depth calculation unit, a corresponding point extraction unit, and a fundamental matrix determination unit. The corresponding point acquisition unit acquires a plurality of first corresponding points of the images. The first fundamental matrix calculation unit calculates a first fundamental matrix based on the first corresponding points. The depth calculation unit calculates depths for the first corresponding points based on the first fundamental matrix. The corresponding point extraction unit extracts a plurality of second (Continued)

corresponding points from the first corresponding points based on the depths. The fundamental matrix determination unit calculates a second fundamental matrix based on the second corresponding points.

17 Claims, 10 Drawing Sheets

(51) Int. Cl.
H04N 5/232 (2006.01)
H04N 13/00 (2006.01)
G06T 7/73 (2017.01)
G06T 7/579 (2017.01)
G06T 7/246 (2017.01)

(52) U.S. Cl.
CPC ..... *H04N 5/23229* (2013.01); *H04N 5/23254* (2013.01); *H04N 5/23267* (2013.01); *H04N 13/0022* (2013.01); *G06T 2207/10012* (2013.01); *G06T 2207/10028* (2013.01); *G06T 2207/30244* (2013.01)

(58) Field of Classification Search
CPC ... G06T 7/0044; G06T 7/0071; G06T 7/2033; H04N 13/0022; H04N 5/23229; H04N 5/23254; H04N 5/23267
USPC .......................................................... 348/46
See application file for complete search history.

(56) References Cited

U.S. PATENT DOCUMENTS

| | | | | |
|---|---|---|---|---|
| 9,183,634 | B2* | 11/2015 | Tsuzuki | G06T 7/002 |
| 2007/0109660 | A1* | 5/2007 | Hayashi | G02B 7/365 |
| | | | | 359/675 |
| 2008/0239064 | A1* | 10/2008 | Iwasaki | H04N 13/0239 |
| | | | | 348/47 |
| 2010/0097444 | A1* | 4/2010 | Lablans | G03B 35/00 |
| | | | | 348/46 |
| 2010/0245851 | A1* | 9/2010 | Teodorescu | G01B 11/2509 |
| | | | | 356/625 |
| 2011/0091096 | A1* | 4/2011 | Morris | G03B 19/22 |
| | | | | 382/154 |
| 2011/0122235 | A1* | 5/2011 | Lee | H04N 13/0452 |
| | | | | 348/51 |
| 2011/0234759 | A1 | 9/2011 | Yamaya et al. | |
| 2011/0242273 | A1* | 10/2011 | Shimaya | G06T 7/0022 |
| | | | | 348/36 |
| 2011/0279649 | A1* | 11/2011 | Choi | H04N 5/23248 |
| | | | | 348/46 |
| 2012/0002060 | A1* | 1/2012 | Kusanagi | G02B 27/646 |
| | | | | 348/208.4 |
| 2012/0162374 | A1* | 6/2012 | Markas | H04N 13/0221 |
| | | | | 348/46 |
| 2012/0287246 | A1* | 11/2012 | Katayama | H04N 13/0011 |
| | | | | 348/46 |
| 2013/0222555 | A1* | 8/2013 | Nagasaka | H04N 13/021 |
| | | | | 348/50 |

FOREIGN PATENT DOCUMENTS

| | | |
|---|---|---|
| JP | 2004-213278 A | 7/2004 |
| JP | 2007-256029 A | 10/2007 |
| JP | 2008-259076 A | 10/2008 |

OTHER PUBLICATIONS

Tsai et al, Two View to N-View Conversion without Depth, 2011.*
Bauer et al, Efficient Sparse 3D Reconstruction by Space Sweeping, 2006.*
International Preliminary Report on Patentability together with the Written Opinion dated Dec. 31, 2014 received in related International Application No. PCT/JP2013/053883.
International Search Report dated Mar. 26, 2013 issued in PCT/JP2013/053883.
Chinese Office Action dated Feb. 17, 2017 in Chinese Patent Application No. 201380032255.X.

* cited by examiner

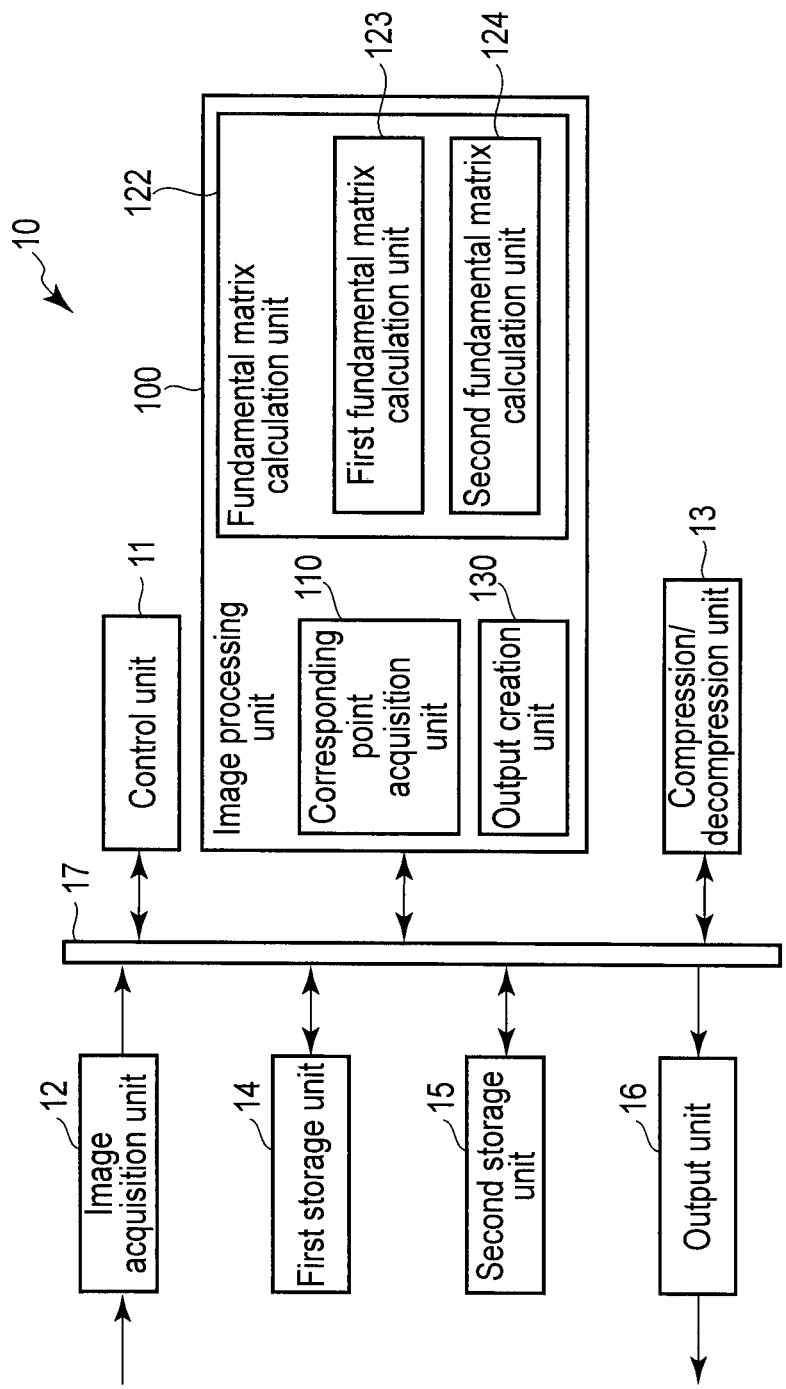
F I G. 1

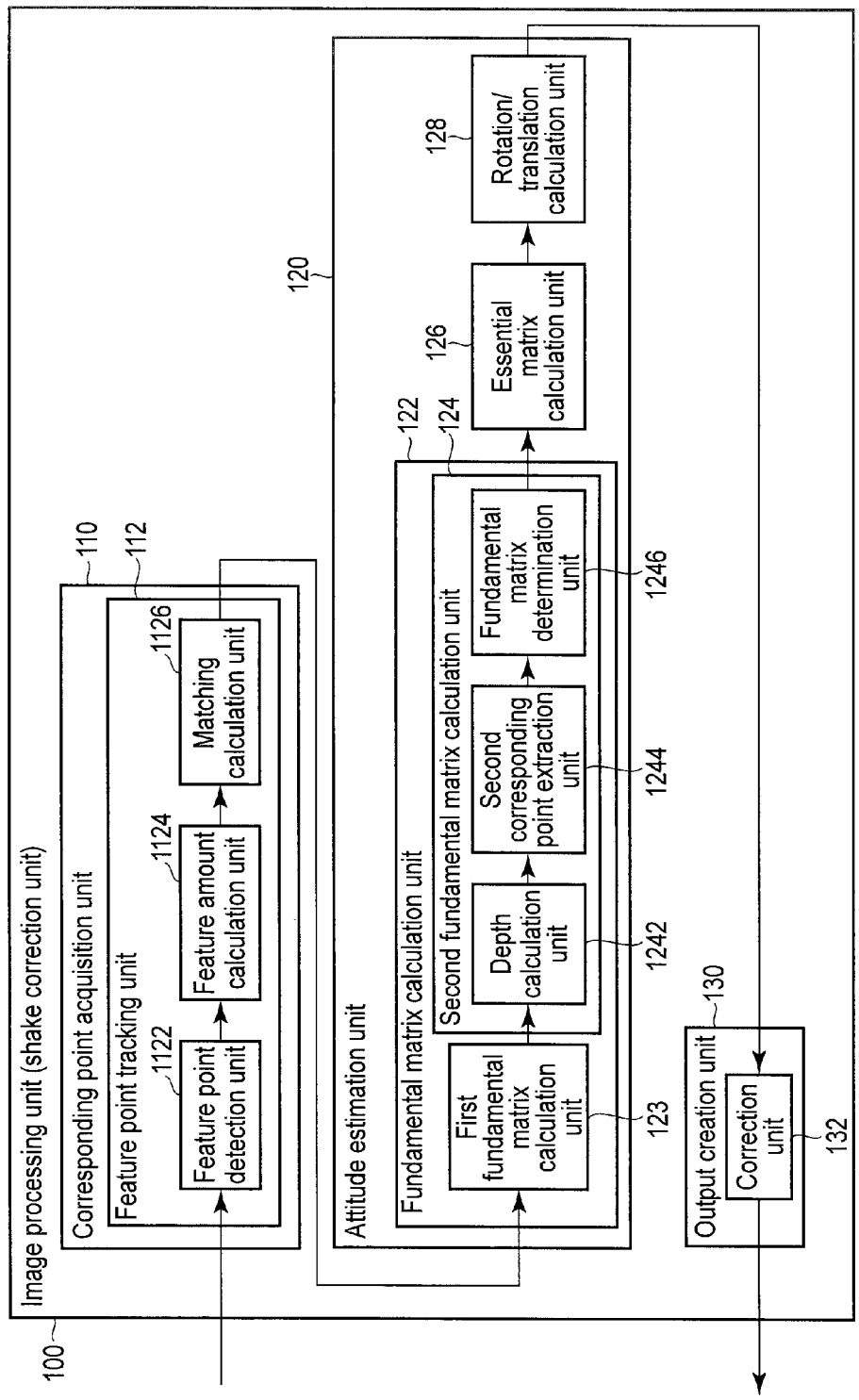
F I G. 4

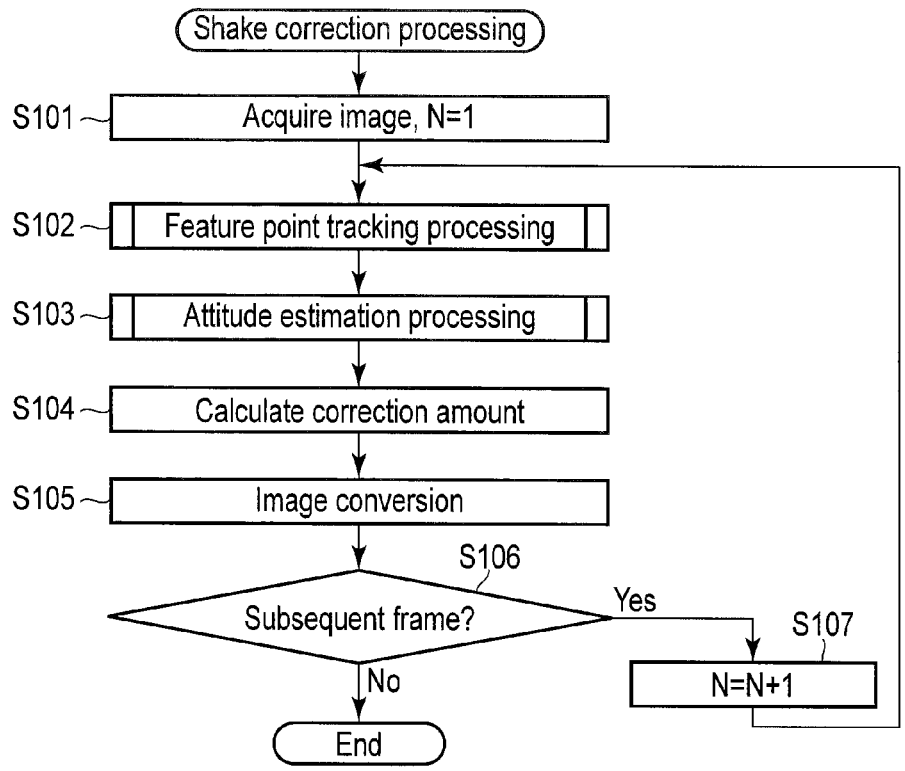
F I G. 5
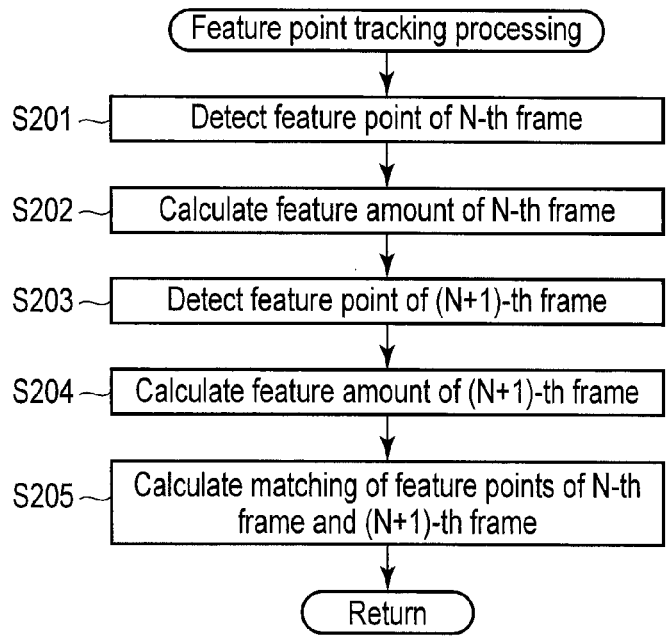
F I G. 6

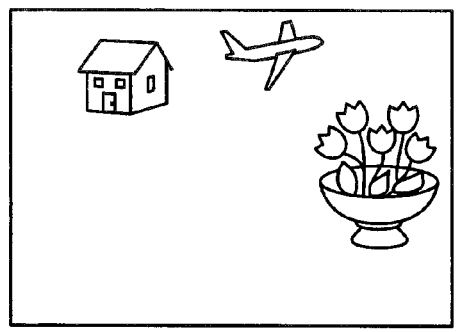
F I G. 7A
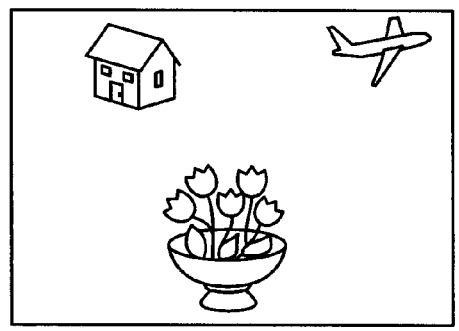
F I G. 7B
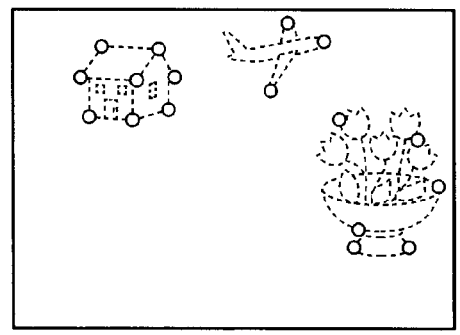
F I G. 8A

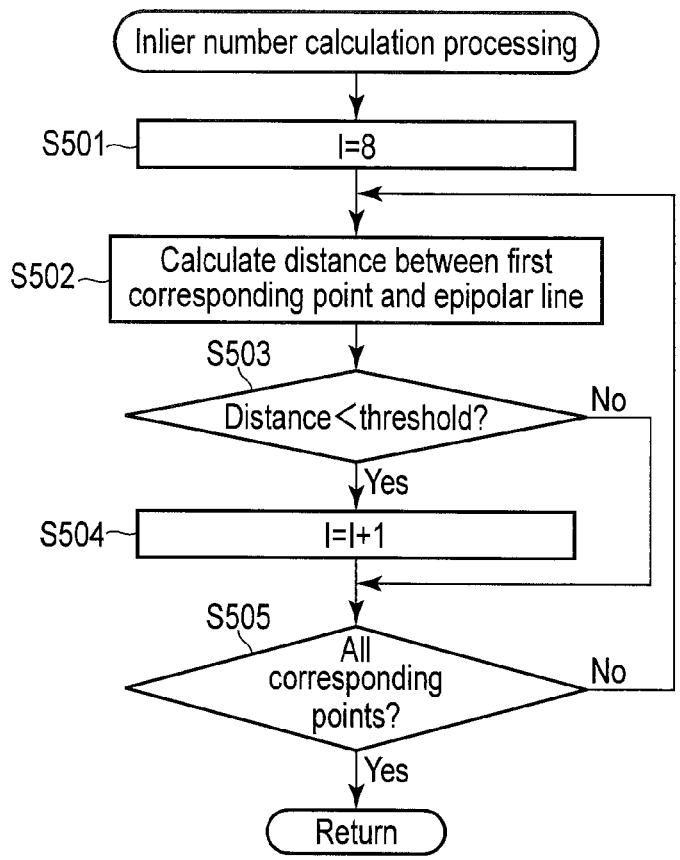
F I G. 12
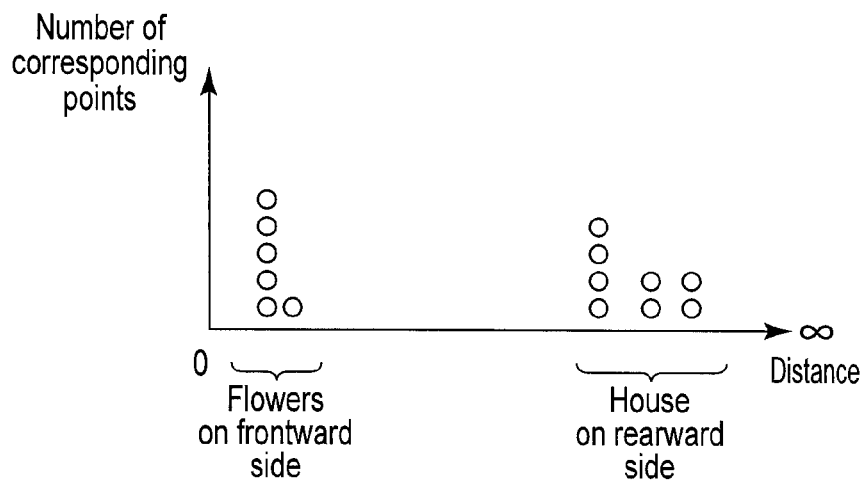
F I G. 13

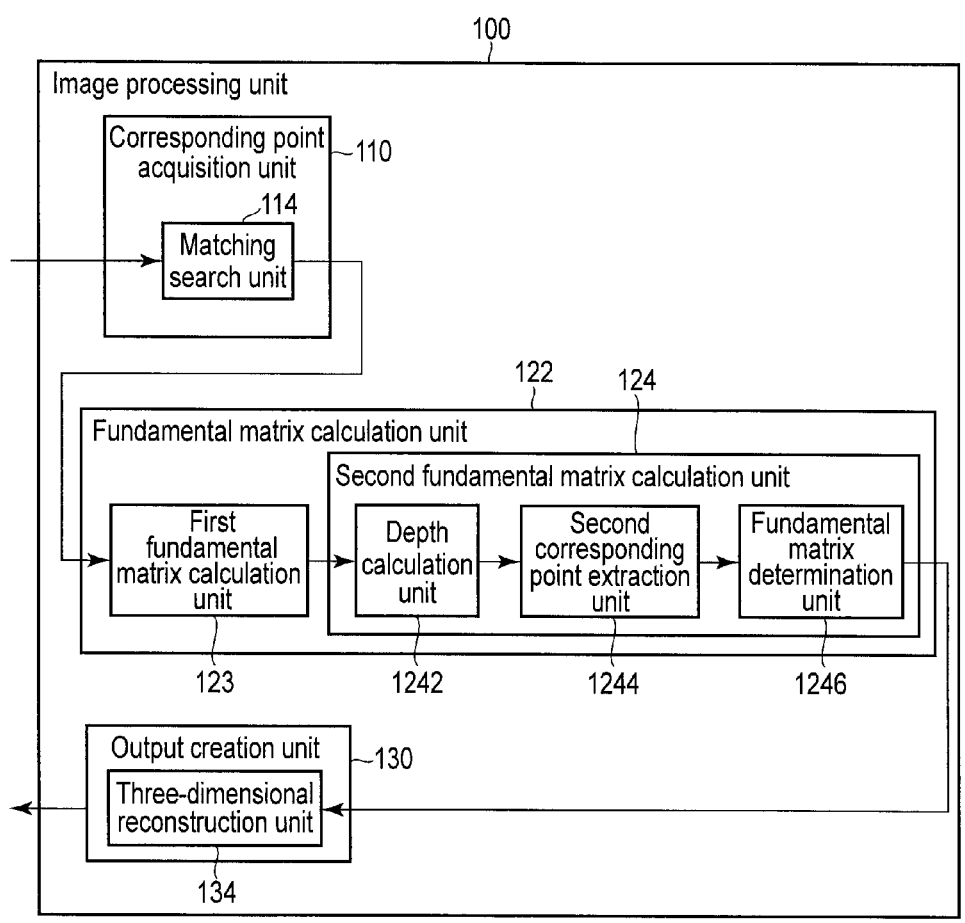
F I G. 15

IMAGE PROCESSING APPARATUS, IMAGING APPARATUS, AND IMAGE PROCESSING METHOD

CROSS-REFERENCE TO RELATED APPLICATIONS

This application is a Continuation Application of PCT Application No. PCT/JP2013/053883, filed Feb. 18, 2013 and based upon and claiming the benefit of priority from prior Japanese Patent Application No. 2012-138569, filed Jun. 20, 2012, the entire contents of all of which are incorporated herein by reference.

BACKGROUND OF THE INVENTION

1. Field of the Invention

The present invention relates to an image processing apparatus, an imaging apparatus, and an image processing method.

2. Description of the Related Art

It is generally known that differences of positions and attitudes of a camera that has acquired a plurality of images of the same subject from different directions when these images are acquired can be obtained based on these images. That is, it is known that a fundamental matrix is obtained based on differences between images and the relationship of the positions and attitudes of the camera described above can be calculated based on the fundamental matrix. For example, Jpn. Pat. Appln. KOKAI Publication No. 2008-259076 discloses a technology that calculates motion information between a plurality of images based on a fundamental matrix calculated from these images and an essential matrix calculated from the fundamental matrix and makes vibration isolation corrections of an image based on the motion information. The fundamental matrix is calculated based on corresponding points corresponding to each other between target images.

BRIEF SUMMARY OF THE INVENTION

According to an aspect of the present invention, an image processing apparatus includes: an image acquisition unit that acquires a plurality of images; a corresponding point acquisition unit that acquires a plurality of first corresponding points corresponding to each other between the images; a first fundamental matrix calculation unit that calculates a first fundamental matrix based on the first corresponding points; a depth calculation unit that calculates depths for the first corresponding points based on the first fundamental matrix; a corresponding point extraction unit that extracts a plurality of second corresponding points from the first corresponding points based on the depths; and a fundamental matrix determination unit that calculates a second fundamental matrix based on the second corresponding points, wherein the corresponding point extraction unit extracts the second corresponding points from the first corresponding points based on the depths such that the second corresponding points includes a nearest one of the first corresponding points and a farthest one of the first corresponding points.

According to another aspect of the present invention, an imaging apparatus includes: an imaging unit that captures an image of a subject; an image acquisition unit that acquires a plurality of the images of the same subject captured at different time; a corresponding point acquisition unit that acquires a plurality of first corresponding points corresponding to each other between the images; a first fundamental matrix calculation unit that calculates a first fundamental matrix based on the first corresponding points; a depth calculation unit that calculates depths for the first corresponding points based on the first fundamental matrix; a corresponding point extraction unit that extracts a plurality of second corresponding points from the first corresponding points based on the depths; a fundamental matrix determination unit that calculates a second fundamental matrix based on the second corresponding points; and a correction unit that corrects a shake present between the images based on the second fundamental matrix, wherein the corresponding point extraction unit extracts the second corresponding points from the first corresponding points based on the depths such that the second corresponding points includes a nearest one of the first corresponding points and a farthest one of the first corresponding points.

According to another aspect of the present invention, an image processing method includes: acquiring a plurality of images; acquiring a plurality of first corresponding points corresponding to each other between the images; calculating a first fundamental matrix based on the first corresponding points; calculating depths for the first corresponding points based on the first fundamental matrix; extracting a plurality of second corresponding points from the first corresponding points based on the depths; and calculating a second fundamental matrix based on the second corresponding points, wherein the extracted second corresponding points are extracted from the first corresponding points based on the depths such that the second corresponding points includes a nearest one of the first corresponding points and a farthest one of the first corresponding points.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a configuration example of an image processing apparatus according to a first embodiment;

FIG. 4 is a block diagram showing a configuration example of an image processing unit according to the first embodiment;

FIG. 5 is a flow chart showing an example of shake correction processing according to the first embodiment;

FIG. 6 is a flow chart showing an example of feature point tracking processing according to the first embodiment;

FIG. 7A is a diagram illustrating the feature point tracking processing according to the first embodiment and is a schematic diagram showing an image example of an N-th frame to be processed;

FIG. 7B is a diagram illustrating the feature point tracking processing according to the first embodiment and is a schematic diagram showing an image example of an (N+1)-th frame to be processed;

FIG. 8A is a diagram illustrating the feature point tracking processing according to the first embodiment and is a schematic diagram showing an example of feature points in an image of the N-th frame to be processed;

FIG. 12 is a flow chart showing an example of inlier number calculation processing according to the first embodiment;

FIG. 13 is a diagram illustrating the attitude estimation processing according to the first embodiment and is a diagram showing an example of the relationship between the number of inlier corresponding points and the depth.

FIG. 15 is a block diagram showing a configuration example of an image processing unit according to a third embodiment.

DETAILED DESCRIPTION OF THE INVENTION

[First Embodiment]

The first embodiment of the present invention will be described with reference to the drawings. An overview of a configuration example of an image processing apparatus 10 according to the present embodiment is shown in FIG. 1. The image processing apparatus 10 is an apparatus that performs processing on image information containing a plurality of input images, calculates information about differences of positions and attitudes of the camera that has acquired each image, and outputs a result using information of the differences.

Figure 2:
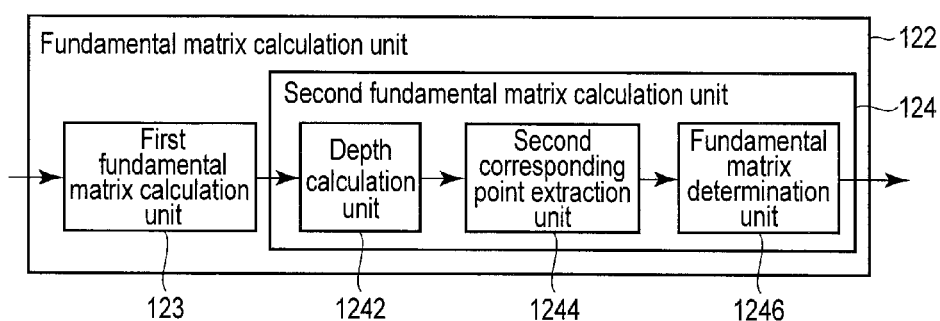
FIG. 2 is a block diagram showing a configuration example of a fundamental matrix calculation unit according to the first embodiment.

The image processing apparatus 10 includes an image processing unit 100, a control unit 11, an image acquisition unit 12, a compression/decompression unit 13, a first storage unit 14, a second storage unit 15, and an output unit 16. Each unit is mutually connected via a bus 17. As will be described later, the image processing unit 100 plays a key role in processing related to the image processing apparatus 10. The image processing unit 100 includes a corresponding point acquisition unit 110, a fundamental matrix calculation unit 122, and an output creation unit 130. The corresponding point acquisition unit 110 acquires a plurality of points corresponding to each other between a plurality of images acquired by the image acquisition unit 12 or the like and input into the image processing unit 100 via the bus 17 as first corresponding points. The fundamental matrix calculation unit 122 calculates a fundamental matrix representing the relationship between a plurality of input images. As shown in FIG. 2, the fundamental matrix calculation unit 122 includes a first fundamental matrix calculation unit 123 and a second fundamental matrix calculation unit 124. The output creation unit 130 creates output information about an input image based on a fundamental matrix calculated by the fundamental matrix calculation unit 122.

The control unit 11 includes, for example, a CPU. The control unit 11 controls the operation of each unit of the image processing apparatus 10, and performs various operations. The image acquisition unit 12 acquires image information (image data) containing a plurality of images (moving images) to be processed by the image processing apparatus 10. The compression/decompression unit 13 compresses or decompresses image information. The first storage unit 14 includes, for example, a RAM and performs temporary storage needed for various kinds of processing and operations. The second storage unit 15 includes, for example, a ROM and stores various programs needed for control and operations of the image processing apparatus 10 and the like. The output unit 16 outputs output information created by the image processing unit 100. The first storage unit 14 and the second storage unit 15 are configured separately in the present embodiment, but may also be configured as a storage unit.

Figure 3:
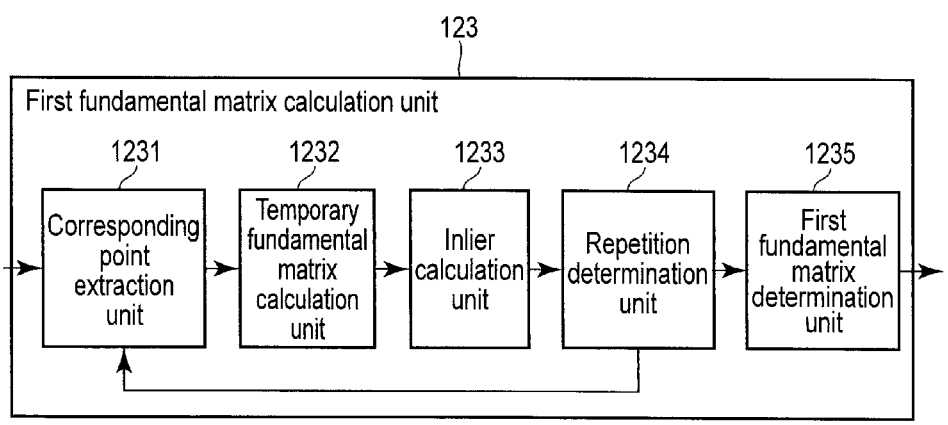
FIG. 3 is a block diagram showing a configuration example of a first fundamental matrix calculation unit according to the first embodiment.

The fundamental matrix calculation unit 122 will be described in more detail. A configuration example of the first fundamental matrix calculation unit 123 is shown in FIG. 3. As shown in FIG. 3, the first fundamental matrix calculation unit 123 includes a corresponding point extraction unit 1231, a temporary fundamental matrix calculation unit 1232, an inlier calculation unit 1233, a repetition determination unit 1234, and a first fundamental matrix determination unit 1235. The corresponding point extraction unit 1231 randomly extracts, for example, eight points from the first corresponding points acquired by the corresponding point acquisition unit 110. The temporary fundamental matrix calculation unit 1232 calculates a fundamental matrix based on the eight points of the first corresponding points extracted by the corresponding point extraction unit 1231. A fundamental matrix calculated from the randomly selected eight points will be called a temporary fundamental matrix. The inlier calculation unit 1233 calculates an epipolar line for each of the first corresponding point acquired by the corresponding point acquisition unit 110 based on the temporary fundamental matrix calculated by the temporary fundamental matrix calculation unit 1232 and calculates a distance between the epipolar line and the relevant first corresponding point. The inlier calculation unit 1233 determines whether the distance to the epipolar line is smaller than (or smaller than or equal to) a predetermined threshold for each first corresponding point, sets the corresponding point smaller than the predetermined threshold as an inlier corresponding point, and counts the number of the corresponding points set as inlier corresponding points of the first corresponding points. The repetition determination unit 1234 causes the corresponding point extraction unit 1231, the temporary fundamental matrix calculation unit 1232 and the inlier calculation unit 1233 to repeat calculation of the number of inlier corresponding points corresponding to each temporary fundamental matrix. That is, the processing of the corresponding point extraction unit 1231, the temporary fundamental matrix calculation unit 1232 and the inlier calculation unit 1233 are repeated a predetermined number of times or until a predetermined condition is satisfied to acquire a plurality of temporary fundamental matrices and the numbers of inlier corresponding points corresponding to the temporary fundamental matrices. The first fundamental matrix determination unit 1235 compares the numbers of inlier corresponding points corresponding to each temporary fundamental matrix to determine the temporary fundamental matrix with the largest number of the inlier corresponding points as the first fundamental matrix.

As shown in FIG. 2, the second fundamental matrix calculation unit 124 includes a depth calculation unit 1242, a second corresponding point extraction unit 1244, and a fundamental matrix determination unit 1246. The depth calculation unit 1242 reconstructs three-dimensional coordinates of each inlier corresponding point based on the first fundamental matrix. The second corresponding point extraction unit 1244 extracts eight points from the inlier corresponding points such that the depth in the depth direction becomes deeper. The eight points are called second corresponding points. The fundamental matrix determination unit 1246 calculates a second fundamental matrix based on the second corresponding points.

Thus, three-dimensional coordinates can be reconstructed from correct corresponding points by reconstructing three-dimensional coordinates from the inlier corresponding points and a second fundamental matrix can be calculated from extraction of the correct second corresponding points without repeated operations.

Hereinafter, a concrete description will be provided by assuming that the image processing apparatus 10 is an apparatus that performs processing to remove a shake on input moving images and outputs moving images from which the shake has been removed. That is, the image acquisition unit 12 acquires data of a plurality of images (moving images). The image data contains images containing, as shown in FIG. 7A and the like described later, information about a subject. The image processing unit 100 functions as a shake correction unit. An overview of a configuration example of the image processing unit 100 according to the present embodiment is shown in FIG. 4. The image processing unit 100 includes the corresponding point acquisition unit 110, the attitude estimation unit 120 including the fundamental matrix calculation unit 122, and the output creation unit 130.

The corresponding point acquisition unit 110 includes a feature point tracking unit 112 that calculates corresponding points based on feature points in an image acquired by the image acquisition unit 12. The feature point tracking unit 112 includes a feature point detection unit 1122, a feature amount calculation unit 1124, and a matching calculation unit 1126. The image data (moving images) acquired by the image acquisition unit 12 is input to the feature point detection unit 1122 via the bus 17. The feature point detection unit 1122 detects respective feature point candidates of the N-th image and the (N+1)-th image (between consecutive images) of the moving images. The feature amount calculation unit 1124 calculates a feature amount of each feature point candidate detected by the feature point detection unit 1122 and determines a point with a high feature amount as a feature point. The matching calculation unit 1126 acquires a correspondence for a feature point determined by the feature amount calculation unit 1124 between the feature point in the N-th frame and the feature point in the (N+1)-th frame. A feature point whose correspondence has been acquired will be called the first corresponding point.

The attitude estimation unit 120 includes the aforementioned fundamental matrix calculation unit 122, an essential matrix calculation unit 126, and a rotation/translation calculation unit 128. The essential matrix calculation unit 126 calculates an essential matrix based on the second fundamental matrix. The rotation/translation calculation unit 128 calculates rotation and translation of the imaging apparatus imaging the (N+1)-th frame with respect to the imaging apparatus imaging the N-th frame based on the essential matrix.

The output creation unit 130 includes a correction unit 132 that corrects a shake. The correction unit 132 makes a correction that removes a shake between the N-th image and the (N+1)-th image based on the rotation and translation of the imaging apparatus calculated by the attitude estimation unit 120. The output unit 16 outputs moving images from which the shake has been removed.

Next, an operation related to removal of the shake by the image processing apparatus 10 according to the present embodiment will be described. The shake correction processing by the image processing apparatus 10 will be described with reference to the flow chart shown in FIG. 5. Image data (moving image data) acquired by the image acquisition unit 12 is input into the image processing unit (shake correction unit) 100 via the bus 17. In step S101, the image processing unit (shake correction unit) 100 acquires moving images and sets a variable N indicating the frame number to 1. In step S102, the feature point tracking unit 112 of the image processing unit (shake correction unit) 100 performs feature point tracking processing that tracks feature points between the N-th frame and the (N+1)-th frame.

The feature point tracking processing will be described with reference to the flow chart shown in FIG. 6 and schematic diagrams shown in FIGS. 7A to 9. FIG. 7A shows an image of the N-th frame and FIG. 7B shows an image of the (N+1)-th frame. Examples shown in these figures are images of a scene in which there are flowers on the frontward side, there is a house on the rearward side, and an airplane is flying. In FIGS. 7A and 7B, the image of the (N+1)-th frame is taken with respect to the image of the N-th frame by the imaging unit that has taken these images after being moved in the right direction.

In the feature point tracking processing in the present embodiment, as shown in FIG. 6, first in step S201, the feature point detection unit 1122 of the feature point tracking unit 112 detects feature point candidates in the N-th frame. The feature point detection unit 1122 detects, for example, edges of an object, intersections (corners) of lines and the like as feature point candidates. For the detection of feature point candidates, for example, the method using the generally known Harris operator can be used. Also, for example, the method of the SUSAN (Smallest Univalue Segment Assimilating Nucleus) operator that detects edges may be used. The Harris operator and the SUSAN operator are examples and other methods can also be used.

Figure 8B:
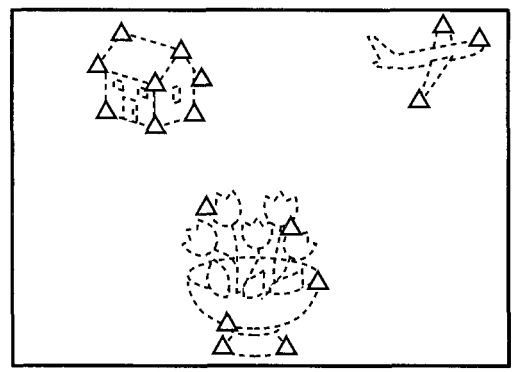
FIG. 8B is a diagram illustrating the feature point tracking processing according to the first embodiment and is a schematic diagram showing an example of the feature points in the image of the (N+1)-th frame to be processed.
Figure 9:
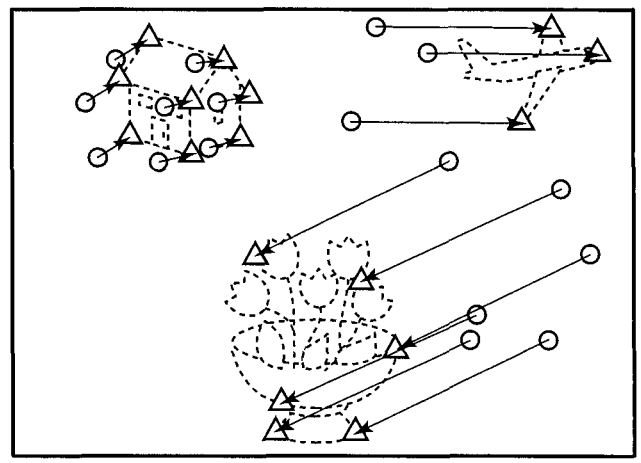
FIG. 9 is a diagram illustrating the feature point tracking processing according to the first embodiment and is a schematic diagram showing an example of correspondence of the feature points of the image to be processed.

In step S202, the feature amount calculation unit 1124 of the feature point tracking unit 112 calculates a feature amount of each feature point candidate detected in step S201. The feature amount can be calculated by using, for example, generally known method, e.g., SIFT (Scale Invariant Feature Transform) or SURF (Speeded Up Robust Features). SIFT and SURF are examples and other methods can also be used. The feature amount calculation unit 1124 determines feature points that seem to be reliable among feature point candidates as feature points based on the feature amount. For example, when the image of the N-th frame is the image shown in FIG. 7A, as a result of step S202, feature points as indicated schematically by circles in FIG. 8A are determined as feature points. Normally, the quantity of feature points may reach a few thousand points, but only several feature points are illustrated here to simplify the description.

In step S203, the feature point detection unit 1122 of the feature point tracking unit 112 detects feature point candidates of the (N+1)-th frame in the same manner as in step S201. In step S204, the feature amount calculation unit 1124 calculates a feature amount of each feature point candidate of the (N+1)-th frame in the same manner as in step S202 to determine feature points. For example, when the image of the (N+1)-th frame is the image shown in FIG. 7B, as a result of step S204, feature points as indicated schematically by triangles in FIG. BE are determined as feature points.

After feature points of the N-th frame and feature points of the (N+1)-th frame are determined, next in step S205, the matching calculation unit 1126 of the feature point tracking unit 112 determines correspondences of feature points of the N-th frame and the (N+1)-th frame by using the feature points of the N-th frame and the (N+1)-th frame and feature amounts thereof. That is, corresponding points related so as to be the same point of a subject between images are determined. In the case of, for example, the image of the N-th frame and the image of the (N+1)-th frame shown in FIGS. 7A and 7B respectively, a vector representation of the correspondence in the image of the (N+1)-th frame is as shown in the schematic diagram of FIG. 9. A feature point whose correspondence between the N-th frame and the (N+1)-th frame has been determined will be called the first corresponding point. After step S205, the processing returns to the shake correction processing described with reference to FIG. 5.

As will be described later, the feature point tracking processing is performed by increasing the value of N by 1 each time. In the feature point tracking processing when N≥2, therefore, feature points and feature amounts of the N-th frame are calculated during the feature point tracking processing of the (N−1)-th frame. In steps S201 and S202, feature points and feature amounts of the N-th frame calculated in the feature point tracking processing of the (N−1)-th frame may be read out.

Figure 10:
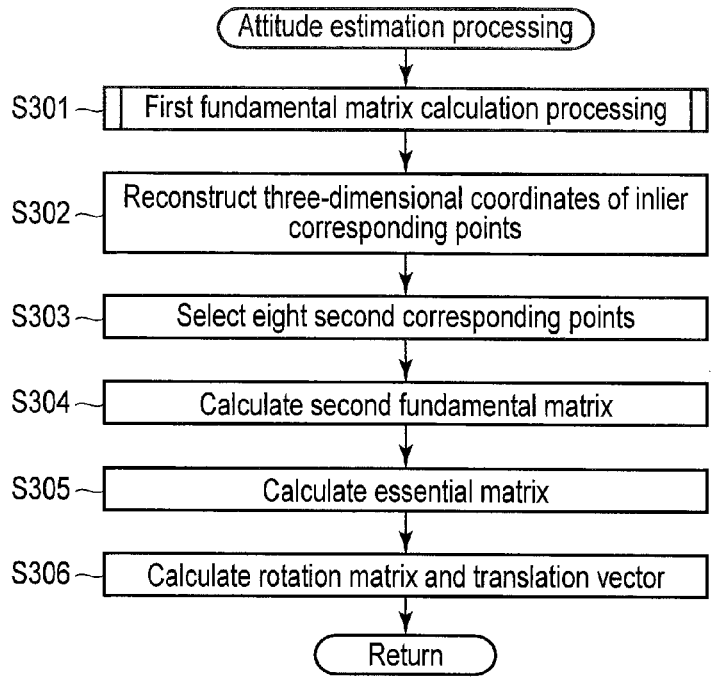
FIG. 10 is a flow chart showing an example of attitude estimation processing according to the first embodiment.

The description will continue by returning to FIG. 5. In step S103, the attitude estimation unit 120 of the image processing unit (shake correction unit) 100 performs attitude estimation processing of the (N+1)-th frame with respect to the N-th frame. The attitude estimation processing will be described with reference to the flow chart shown in FIG. 10. In step S301, the first fundamental matrix calculation unit 123 of the attitude estimation unit 120 performs first fundamental matrix calculation processing. This processing is performed by using, for example, RANSAC (RANdom SAmple Consensus).

Figure 11:
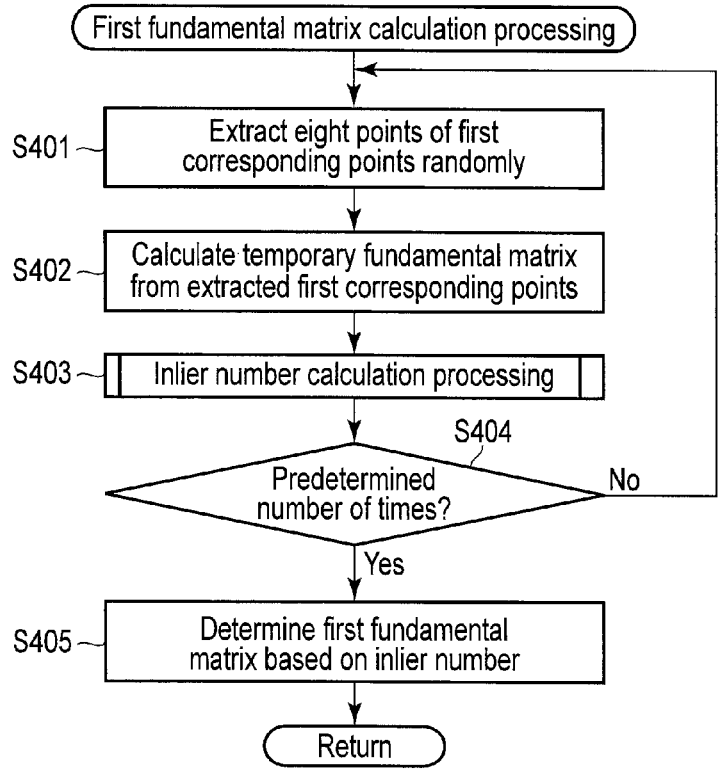
FIG. 11 is a flow chart showing an example of first fundamental matrix calculation processing according to the first embodiment.

The first fundamental matrix calculation processing will be described with reference to the flow chart shown in FIG. 11. In step S401, the corresponding point extraction unit 1231 of the first fundamental matrix calculation unit 123 randomly extracts a plurality (eight points in the present embodiment) of first corresponding points from first corresponding points determined by the feature point tracking processing. In step S402, the temporary fundamental matrix calculation unit 1232 of the first fundamental matrix calculation unit 123 calculates a fundamental matrix based on the extracted eight first corresponding points using, for example, a generally known eight-point algorithm. The fundamental matrix calculated here will be called a temporary fundamental matrix.

In step S403, the inlier calculation unit 1233 of the first fundamental matrix calculation unit 123 performs inlier number calculation processing. In the inlier number calculation processing, an epipolar geometry related to two images, i.e., the N-th frame and the (N+1)-th frame, is considered. In this case, when the distance of each first corresponding point determined by the feature point tracking processing to an epipolar line (evaluation line) determined by the temporary fundamental matrix is smaller than a predetermined threshold, the corresponding point is considered as inlier (highly evaluated). In the inlier number calculation processing, among a plurality of first corresponding points, the number of corresponding points that are inlier is determined.

The inlier number calculation processing will be described with reference to the flow chart shown in FIG. 12. In step S501, the inlier calculation unit 1233 sets a variable I indicating the number of inliers to 8. This is used in the present embodiment to count first corresponding points used for calculation of a temporary fundamental matrix as inliers.

Subsequently, the following processing is performed on all first corresponding points determined in the feature point tracking processing. In step S502, the inlier calculation unit 1233 calculates the distance between the epipolar line determined by the temporary fundamental matrix and each intended first corresponding point. In step S503, the inlier calculation unit 1233 determines whether the distance to the epipolar line calculated in step S502 is less than (or equal to or less than) a predetermined threshold. When the distance is determined to be less than the threshold, in step S504, the inlier calculation unit 1233 increments the variable I indicating the number of inliers by 1. Among first corresponding points, corresponding points whose distance to the epipolar line is less than the predetermined threshold will be called inlier corresponding points. Then, the processing proceeds to step S505. When the distance is determined to be equal to or more than the predetermined threshold in step S503, the processing proceeds to step S505.

In step S505, the inlier calculation unit 1233 determines whether the processing of step S502 to step S504 has been performed on all first corresponding points. When determined that the above processing has not been performed on all first corresponding points, the processing returns to step S502 to perform the above processing on the subsequent first corresponding point. When determined in the determination in step S505 that the above processing has been performed on all first corresponding points, the processing returns to the first fundamental matrix calculation processing with the variable I as a return value.

In this manner, of all first corresponding points, the number I of first corresponding points that are inlier for a first temporary fundamental matrix is calculated. A temporary fundamental matrix with an increasing number of inlier corresponding points can be considered to be a fundamental matrix that represents the relationship between the image of the N-th frame and the image of the (N+1)-th frame more appropriately.

The description will continue by returning to FIG. 11. In step S404, the repetition determination unit 1234 of the first fundamental matrix calculation unit 123 determines whether the processing from step S401 to S403 has been performed a predetermined number of times. When the above processing has not been performed the predetermined number of times, the processing returns to step S401. When the above processing is determined to have been performed the predetermined number of times in step S404, the processing proceeds to step S405. In step S405, the first fundamental matrix determination unit 1235 of the first fundamental matrix calculation unit 123 determines the temporary fundamental matrix with the largest number I of inlier corresponding points as the first fundamental matrix. Inlier corresponding points of the first fundamental matrix are obtained by extracting corresponding points of the house and flowers as static objects in, for example, FIGS. 7A and 7B while deleting corresponding points corresponding to moving objects such as the airplane.

Here, the number of temporary fundamental matrices used to calculate the number of inlier corresponding points based on the determination in step S404 is a predetermined number. However, the present embodiment is not limited to such an example and the number of inlier corresponding points may be calculated for temporary fundamental matrices until a predetermined termination condition is satisfied. After step S405, the processing returns to the attitude estimation processing with the first fundamental matrix as a return value.

The description will continue by returning to FIG. 10. In steps S302 to S304, the second fundamental matrix calculation unit 124 of the attitude estimation unit 120 calculates a second fundamental matrix based on the first fundamental matrix determined in the first fundamental matrix calculation processing. That is, in step S302, the depth calculation unit 1242 of the second fundamental matrix calculation unit 124 reconstructs three-dimensional coordinates of inlier corresponding points using the first fundamental matrix determined by the first fundamental matrix calculation unit 123 (processing in step S301). It is generally known that when a fundamental matrix is used, three-dimensional coordinates of each point in an image corresponding to a space in which a subject is present can be determined. As a result, in the case of an image as shown in, for example, FIG. 7A or 7B, the relationship between the distance representing the depth and the number of inlier corresponding points as shown by a histogram in FIG. 13 can be obtained. Incidentally, corresponding points detected in the airplane in FIGS. 7A and 7B do not become inlier corresponding points and are not shown in FIG. 13 because the airplane is moving.

In step S303, the second corresponding point extraction unit 1244 of the second fundamental matrix calculation unit 124 selects (extracts) a plurality (eight points in the present embodiment) of second corresponding points from inlier corresponding points. In the selection in step S303, the second corresponding point extraction unit 1244 selects inlier corresponding points that are apart from each other in the depth direction based on reconstructed three-dimensional coordinates. The second corresponding point extraction unit 1244 selects (extracts), for example, four inlier corresponding points on the most frontward (nearest) side and four inlier corresponding points on the most rearward (farthest) side as the second corresponding points.

Corresponding points used as the second corresponding points are not limited to four of the nearest inlier corresponding points on the most frontward side and four of the farthest inlier corresponding points on the most rearward side. Various extraction methods that increase a difference of second corresponding points in the depth direction are used. For example, inlier corresponding points satisfying predetermined conditions may be selectively extracted in order from the nearest point and further, inlier corresponding points satisfying predetermined conditions may be selectively extracted in order from the farthest point. When the predetermined conditions are four points from the nearest and four points from the farthest, the above embodiment is established. The predetermined conditions may be, for example, regular extraction like the first, third, fifth, and seventh corresponding points. Also, the predetermined conditions may be, for example, after an image plane is divided into four regions, extraction of one corresponding point from each region. Also, four reliable points may be extracted in order from the frontward side and four reliable points may be extracted in order from the rearward side. For the determination of reliability, for example, a second threshold that is stricter than the threshold used for the inlier number calculation processing may be used. That is, even if the distance between the epipolar line and the inlier corresponding point is smaller than the second threshold, four points on the most frontward side and four points on the rearward side may be selected as second corresponding points. In addition, it is preferable to use points that are apart from each other not only in the depth direction, but also in the image plane. When the reliability of points is determined and points apart from each other in the image plane are used, the accuracy of the obtained second fundamental matrix described later is improved. The second corresponding points may not be four points on the frontward side and four points on the rearward side. However, the second corresponding points are preferably four points on the frontward side and four points on the rearward side.

In step S304, the fundamental matrix determination unit 1246 of the second fundamental matrix calculation unit 124 calculates a second fundamental matrix based on the eight second corresponding points selected in step S303. The calculation of the second fundamental matrix is similar to the calculation method of a temporary fundamental matrix in step S402. In step S305, the essential matrix calculation unit 126 of the attitude estimation unit 120 calculates an essential matrix based on the second fundamental matrix. A generally known method is used to calculate an essential matrix from a fundamental matrix. In step S306, the rotation/translation calculation unit 128 of the attitude estimation unit 120 calculates a rotation matrix and a translation vector based on the essential matrix calculated in step S305. The rotation matrix and the translation vector represent differences between the position and the attitude of the camera that acquired the image of the N-th frame and the position and the attitude of the camera that acquired the image of the (N+1)-th frame. That is, the rotation matrix and the translation vector represent camera movement between the time when the image of the N-th frame is acquired and the time when the image of the (N+1)-th frame is acquired. Then, the processing returns to the shake correction processing described with reference to FIG. 5.

The description will continue by returning to FIG. 5. In step S104, the correction unit 132 of the image processing unit (shake correction unit) 100 calculates the correction amount of shake based on the rotation matrix and the translation vector calculated in the attitude estimation processing. That is, the correction unit 132 of the output creation unit 130 calculates an appropriate correction amount of images to cancel out camera movement that occurred between the N-th frame and the (N+1)-th frame determined as the rotation matrix and the translation vector calculated in step S306. In this case, for example, a low-pass filter is used to determine the correction amount such that, instead of a rapid correction, a smooth correction is made. In step S105, the correction unit 132 performs an image conversion based on the correction amount calculated in step S104 to remove image shake. In this manner, an image from which shake that arose between the N-th frame and the (N+1)-th frame has been remove is created.

In step S106, the image processing unit (shake correction unit) 100 determines whether there is a subsequent frame. When a subsequent frame is determined to be present, in step S107, the image processing unit (shake correction unit) 100 substitutes N+1 into the variable N. Then, the processing returns to step S102. When a subsequent frame is determined not to be present in the determination in step S107, the shake correction processing terminates. An image from which shake has been removed is output via the output unit 16. The above shake removal processing may successively be performed on each frame output from the image acquisition unit 12 so that an image from which shake has been removed is successively output from the output unit 16.

Thus, for example, the image acquisition unit 12 functions as an image acquisition unit that acquires a plurality of images. For example, the corresponding point acquisition unit 110 functions as a corresponding point acquisition unit that acquires a plurality of first corresponding points corresponding to each other between the plurality of images. For example, the first fundamental matrix calculation unit 123 functions as a first fundamental matrix calculation unit that calculates a first fundamental matrix based on the plurality of first corresponding points. For example, the depth calculation unit 1242 functions as a depth calculation unit that calculates depths corresponding to the plurality of first corresponding points based on the first fundamental matrix. For example, the second corresponding point extraction unit 1244 functions as a corresponding point extraction unit that extracts a plurality of second corresponding points from the plurality of first corresponding points. For example, the fundamental matrix determination unit 1246 functions as a fundamental matrix determination unit that calculates a second fundamental matrix based on the plurality of second corresponding points. For example, the correction unit 132 functions as a correction unit that corrects shake present between the plurality of images based on the second fundamental matrix.

According to the present embodiment, the image processing apparatus 10 can output images without shake by removing shake from input moving images. In the present embodiment, shake is removed based on only input images and thus, when the image processing apparatus 10 is implemented in a digital camera as, for example, an image stabilization mechanism, no other sensor or drive mechanism is needed.

In general, when a fundamental matrix is determined from images, it is known that no fundamental matrix can be calculated when based on corresponding points without depth in a subject and an error of a calculated fundamental matrix increases and accuracy decreases when based on corresponding points of shallow depths. According to the present embodiment, three-dimensional coordinates of a subject are reconstructed based on a first fundamental matrix calculated by a common method and a fundamental matrix is calculated based on second corresponding points selected such that the depth becomes deeper based on the three-dimensional coordinates. Therefore, when compared with a case in which corresponding points used for calculating a fundamental matrix are randomly selected and are not controlled like when, for example, only RANSAC is used, according to the present embodiment, fundamental matrix calculation accuracy is improved.

In the present embodiment, an example in which shake is removed based on differences of images between the N-th frame and the (N+1)-th frame, that is, between neighboring frames is shown. However, the present embodiment is not limited to the above example and shake may be removed based on differences of images between frames that are several frames apart when, for example, differences can better be extracted if images are apart by several frames.

[Modification of the First Embodiment]

A modification of the first embodiment will be described. Here, only differences from the first embodiment will be described and the same reference numerals are used for the same portions and a description thereof is omitted. In the first embodiment, the feature point tracking unit 112 of the corresponding point acquisition unit 110 performs matching of two images based on feature points. In the present modification, by contrast, a matching search unit performs matching of two images, instead of the feature point tracking unit 112. The matching search unit calculates corresponding points functioning as first corresponding points in the first embodiment by, for example, the commonly known block matching.

The remaining configuration is the same as in the first embodiment. According to the present modification, the image processing apparatus 10 operates in the same manner as in the first embodiment and a similar effect can be achieved. Thus, the corresponding point acquisition unit 110 may use any method to acquire corresponding points as long as points corresponding between an image of the N-th frame and an image of the (N+1)-th frame can be obtained. That is, as the acquisition method of first corresponding points by the corresponding point acquisition unit 110, any feature base matching method, any region base matching method, or any method combining these methods may be used.

[Second Embodiment]

Figure 14:
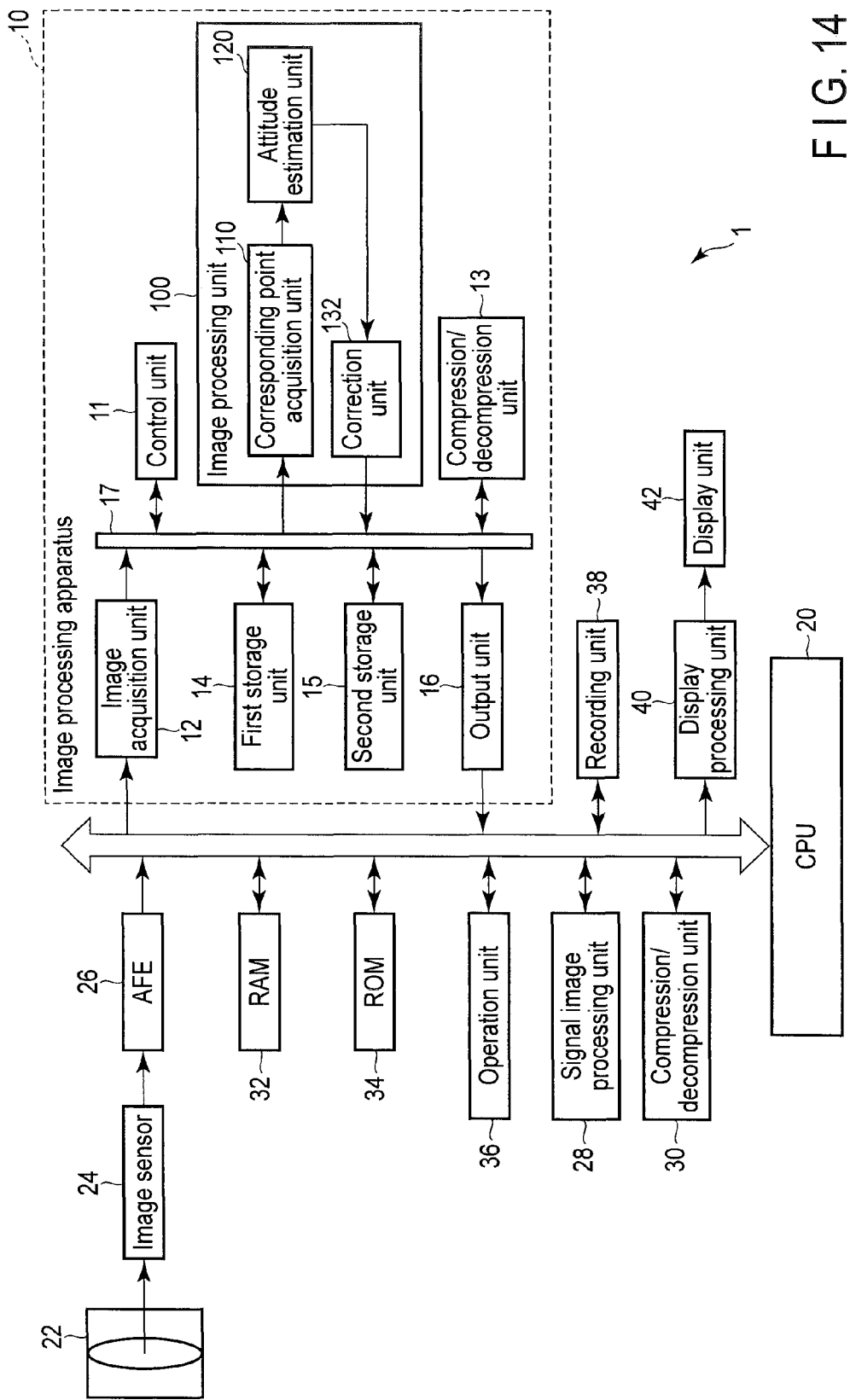
FIG. 14 is a block diagram showing a configuration example of a digital camera including an image processing apparatus according to a second embodiment.

The second embodiment will be described. Here, only differences from the first embodiment will be described and the same reference numerals are used for the same portions and a description thereof is omitted. The present embodiment relates to a digital camera 1 including the image processing apparatus 10 according to the first embodiment. A configuration example of the digital camera 1 according to the present embodiment is shown in FIG. 14. The digital camera 1 includes the image processing apparatus 10 having the image processing unit 100 functioning as a shake correction unit. The digital camera 1 also includes a CPU 20, an imaging optical system 22, an image sensor 24, an analog front end (AFE) 26, a signal image processing unit 28, a compression/decompression unit 30, a random access memory (RAM) 32, a read only memory (ROM) 34, an operation unit 36, a recording unit 38, a display processing unit 40, and a display unit 42.

The CPU 20 functions as a control unit and controls each unit of the digital camera 1. The imaging optical system 22 includes a lens and a diaphragm and forms a subject image on the image sensor 24. The image sensor 24 converts the subject image guided via the imaging optical system 22 into an electric signal. The AFE 26 performs analog signal processing such as correlated double sampling, analog gain control, and A/D conversion. The signal image processing unit 28 performs image processing such as color separation, white balance, and gamma conversion on a digital image signal output from the AFE 26. The compression/decompression unit 30 compresses or decompresses an image. The RAM 32 temporary stores information needed for performs various kinds of processing and operation. The ROM 34 stores various programs needed for control and operations of the digital camera 1. The operation unit 36 receives input of instructions related to the operation of the digital camera 1 from the user. The recording unit 38 is, for example, removably connected to the digital camera 1 and records an image acquired by the digital camera 1. The display processing unit 40 performs image processing for images displayed by the display unit 42. The display unit 42 includes, for example, a liquid crystal display and displays an image processed by the display processing unit 40.

Image processing of an image signal of a subject converted into an electric signal after entering the image sensor 24 via the imaging optical system 22 is performed by the AFE 26 and the signal image processing unit 28. Such an image signal is successively input into the image processing apparatus 10. The image processing apparatus 10 successively performs shake correction processing described in the first embodiment on an input image. A signal of an image from which shake has been removed is output from the image processing apparatus 10. The signal of the image from which shake has been removed is displayed on the display unit 42 via the display processing unit 40. The signal of the image from which shake has been removed is also recorded in the recording unit 38.

According to the present embodiment, shake is removed by the image processing apparatus 10 as described in the first embodiment. Therefore, image shake caused by camera movement or the like of the user operating the digital camera 1 is removed and an image recorded in the recording unit 38 or displayed on the display unit 42 is of higher quality than an image acquired by a camera that does not include the image processing apparatus 10.

[Third Embodiment]

The third embodiment will be described. Here, only differences from the first embodiment will be described and the same reference numerals are used for the same portions and a description thereof is omitted. An image processing apparatus 10 according to the present embodiment is an apparatus that performs a three-dimensional reconstruction of a subject based on a plurality of images of the same subject taken from different directions. A configuration example of an image processing unit 100 according to the present embodiment is shown in FIG. 15. In the present embodiment, a corresponding point acquisition unit 110 in the example shown in FIG. 15 includes, like the modification of the first embodiment, a matching search unit 114. Instead of the matching search unit 114, a feature point tracking unit 112 like in the first embodiment may be used. In the present embodiment, a fundamental matrix calculation unit 122 calculates a second fundamental matrix based on corresponding points output from the matching search unit 114 in the same manner as in the first embodiment. Also in the present embodiment, an output creation unit 130 includes a three-dimensional reconstruction unit 134. The three-dimensional reconstruction unit 134 performs a three-dimensional reconstruction of a subject based on a second fundamental matrix.

The operation of the image processing apparatus 10 according to the present embodiment will briefly be described. In the present embodiment, an image acquisition unit 12 acquires, for example, two images of the same subject taken from different directions. The corresponding point acquisition unit 110 acquires first corresponding points of the two images. The fundamental matrix calculation unit 122 calculates a second fundamental matrix. That is, like in the first embodiment, a first fundamental matrix calculation unit 123 calculates a first fundamental matrix based on the first corresponding points acquired by the corresponding point acquisition unit 110. A depth calculation unit 1242 of a second fundamental matrix calculation unit 124 calculates three-dimensional coordinates of first corresponding points based on the first fundamental matrix. A second corresponding point extraction unit 1244 extracts second corresponding points based on three-dimensional coordinates of first corresponding points such that the depth becomes deeper. A fundamental matrix determination unit 1246 determines a second fundamental matrix based on the second corresponding points.

The three-dimensional reconstruction unit 134 determines three-dimensional coordinates of each point of an input image based on a second fundamental matrix using a generally known method for three-dimensional reconstruction. For example, the three-dimensional reconstruction unit 134 may create a three-dimensional reconstructed image. The result of three-dimensional reconstruction is output via the output unit 16. Thus, the three-dimensional reconstruction unit 134 functions, for example, as a three-dimensional reconstruction unit that performs three-dimensional reconstruction of the subject based on the second fundamental matrix.

According to the present embodiment, the image processing apparatus 10 can perform three-dimensional reconstruction based on two images without position information of the camera that has acquired the images. Also according to the present embodiment, the fundamental matrix calculation unit 122 calculates a second fundamental matrix based on a first fundamental matrix and therefore, the level of accuracy of the obtained fundamental matrix is high. Therefore, the image processing apparatus 10 can perform three-dimensional reconstruction with high accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
one or more processor devices configured to:
acquire image data of a plurality of images;
acquire, from the image data of the plurality of images, a plurality of first corresponding points corresponding to each other between the plurality of images;
calculate a first fundamental matrix based on the plurality of first corresponding points;
calculate depths for the plurality of first corresponding points based on the first fundamental matrix;
extract a plurality of second corresponding points from the plurality of first corresponding points based on the depths such that the plurality of second corresponding points include a nearest one of the plurality of first corresponding points and a farthest one of the plurality of first corresponding points;
calculate a second fundamental matrix based on the plurality of second corresponding points; and
correct a shake present between the plurality of images based on the second fundamental matrix.

2. The image processing apparatus according to claim 1, wherein the one or more processor devices are configured to successively extract the plurality of second corresponding points from the plurality of first corresponding points based on the depths in order from the nearest one of the plurality of first corresponding points, and in order from the farthest one of the plurality of first corresponding points.

3. The image processing apparatus according to claim 1, wherein the one or more processor devices are configured to:
evaluate a reliability of the plurality of first corresponding points based on the first fundamental matrix; and
extract the plurality of second corresponding points based on the reliability.

4. The image processing apparatus according to claim 1, wherein the plurality of images are of a same subject captured at different times.

5. The image processing apparatus according to claim 1, wherein the one or more processor devices are configured to perform three-dimensional reconstruction of the plurality of images based on the second fundamental matrix.

6. The image processing apparatus according to claim 1, wherein the one or more processor devices are configured to calculate the first fundamental matrix by an iterative operation performed by randomly selecting a predetermined number of corresponding points from the plurality of first corresponding points.

7. An imaging apparatus comprising:
an image sensor configured to capture a plurality of images of a subject at different times and to output image data of the plurality of images; and
one or more processor devices configured to:
  acquire the image data of the plurality of images;
  acquire, from the image data of the plurality of images, a plurality of first corresponding points corresponding to each other between the plurality of images;
  calculate a first fundamental matrix based on the plurality of first corresponding points;
  calculate depths for the plurality of first corresponding points based on the first fundamental matrix;
  extract a a plurality of second corresponding points from the plurality of first corresponding points based on the depths such that the plurality of second corresponding points include a nearest one of the plurality of first corresponding points and a farthest one of the plurality of first corresponding points;
  calculate a second fundamental matrix based on the plurality of second corresponding points; and
  correct a shake present between the plurality of images based on the second fundamental matrix.

8. The imaging apparatus according to claim 7, wherein the one or more processor devices are configured to successively extract the plurality of second corresponding points from the plurality of first corresponding points based on the depths in order from the nearest one of the plurality of first corresponding points, and in order from the farthest one of the plurality of first corresponding points.

9. The imaging apparatus according to claim 7, wherein the one or more processor devices are configured to:
  evaluate a reliability of the plurality of first corresponding points based on the first fundamental matrix; and
  extract the plurality of second corresponding points based on the reliability.

10. The imaging apparatus according to claim 7, wherein the one or more processor devices are configured to perform three-dimensional reconstruction of the plurality of images based on the second fundamental matrix.

11. The imaging apparatus according to claim 7, wherein the one or more processor devices are configured to calculate the first fundamental matrix by an iterative operation performed by randomly selecting a predetermined number of corresponding points from the plurality of first corresponding points.

12. An image processing method comprising:
acquiring, by one or more processor devices, image data of a plurality of images;
acquiring, by the one or more processor devices, from the image data of the plurality of images, a plurality of first corresponding points corresponding to each other between the plurality of images;
calculating, by the one or more processor devices, a first fundamental matrix based on the plurality of first corresponding points;
calculating, by the one or more processor devices, depths for the plurality of first corresponding points based on the first fundamental matrix;
extracting, by the one or more processor devices, a plurality of second corresponding points from the plurality of first corresponding points based on the depths such that the plurality of second corresponding points include a nearest one of the plurality of first corresponding points and a farthest one of the plurality of first corresponding points;
calculating, by the one or more processor devices, a second fundamental matrix based on the plurality of second corresponding points; and
correcting, by the one or more processor devices, a shake present between the plurality of images based on the second fundamental matrix.

13. The image processing method according to claim 12, wherein extracting the plurality of second corresponding points comprises successively extracting the plurality of second corresponding points from the plurality of first corresponding points based on the depths in order from the nearest one of the plurality of first corresponding points, and in order from the farthest one of the plurality of first corresponding points.

14. The image processing method according to claim 12, wherein extracting the plurality of second corresponding points comprises:
  evaluating a reliability of the plurality of first corresponding points based on the first fundamental matrix; and
  extracting the plurality of second corresponding points based on the reliability.

15. The image processing method according to claim 12, wherein the plurality of images are of a same subject captured at different times.

16. The image processing method according to claim 12, further comprising:
performing, by the one or more processor devices, three-dimensional reconstruction of the plurality of images based on the second fundamental matrix.

17. The image processing method according to claim 12, wherein calculating the first fundamental matrix comprises calculating the first fundamental matrix by an iterative operation performed by randomly selecting a predetermined number of corresponding points from the plurality of first corresponding points.

* * * * *